(12) United States Patent
Momose

(10) Patent No.: US 10,872,216 B2
(45) Date of Patent: Dec. 22, 2020

(54) IMAGE OUTPUT DEVICE, IMAGE OUTPUT METHOD, AND OUTPUT IMAGE DATA PRODUCTION METHOD

(71) Applicant: SEIKO EPSON CORPORATION, Tokyo (JP)

(72) Inventor: Kiyoharu Momose, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/710,631

(22) Filed: Dec. 11, 2019

(65) Prior Publication Data

US 2020/0193113 A1 Jun. 18, 2020

(30) Foreign Application Priority Data

Dec. 14, 2018 (JP) ................. 2018-234132

(51) Int. Cl.
*G06K 7/14* (2006.01)
*H04N 19/119* (2014.01)
*H04N 19/176* (2014.01)

(52) U.S. Cl.
CPC ......... *G06K 7/1443* (2013.01); *G06K 7/1413* (2013.01); *G06K 7/1452* (2013.01); *G06K 7/1495* (2013.01); *H04N 19/119* (2014.11); *H04N 19/176* (2014.11)

(58) Field of Classification Search
None
See application file for complete search history.

(56) References Cited

U.S. PATENT DOCUMENTS 8,172,144 B2 * 5/2012 Nakajima .......... G06K 7/10851
235/462.01

FOREIGN PATENT DOCUMENTS

JP 2008282339 11/2008
JP 2009272667 11/2009

* cited by examiner

*Primary Examiner* — Kristy A Haupt
(74) *Attorney, Agent, or Firm* — Workman Nydegger

(57) ABSTRACT

An image output device includes an acquisition unit that acquires original image data indicating an original image, a storage unit that certifies, for each of blocks, whether the original image is a barcode area and that stores output image data for outputting the original image, and an output unit that performs output based on the output image data using methods that are different between an area indicated to be the barcode area and an area indicated not to be the barcode area, wherein the output image data is JPEG data compressed for the each block.

8 Claims, 10 Drawing Sheets

IMAGE OUTPUT DEVICE, IMAGE OUTPUT METHOD, AND OUTPUT IMAGE DATA PRODUCTION METHOD The present application is based on, and claims priority from JP Application Serial Number 2018-234132, filed Dec. 14, 2018, the disclosure of which is hereby incorporated by reference herein in its entirety.

BACKGROUND

1. Technical Field

The present disclosure relates to an image output device, an image output method, and an output image data production method.

2. Related Art

In the related art, a technique for outputting an image including a barcode is known. Since the barcode is used to read the information indicated by the barcode, the barcode reader is required to be able to read the barcode accurately when outputting the barcode. JP-A-2008-282339 and JP-A-2009-272667 discloses that various image processes are performed in order to maintain the quality of the barcode, and enable accurate reading.

In the above-described technology in the related art, a complicated process is performed, so that a device with high performance is required.

SUMMARY

An object of the present disclosure is to implement barcode output by simple processing. According to an aspect of the present disclosure, an image output device includes an acquisition unit that acquires original image data indicating an original image, a first generation unit that certifies, for each of blocks, whether the original image is a barcode area, and that generates area information indicating whether the original image is the barcode area, the area information being associated with each of the blocks, a storage unit that stores output image data for outputting the original image, and an output unit that performs output based on the output image data using methods that are different between an area indicated, by the area information, to be the barcode area and an area indicated not to be the barcode area, wherein the output image data is JPEG data compressed for the each block.

In other words, the image output device certifies whether the original image is the barcode area based on the block used for JPEG compression. Therefore, it is possible to certify a barcode area by using part of the process performed in JPEG compression, and it can be certified, by the simple process without performing complicated processing, whether the original image is the barcode. The configuration in which the barcode is output based on the result of the certification makes it possible to implement barcode output by simple processing.

The image output device may further include a division unit that divides the original image data into the blocks, and a second generation unit that generates, as the output image data, JPEG data obtained by compressing the original image data for the each block. According to this configuration, it is possible to implement certification and output of the barcode area by simple processing in an image output device having a function of performing JPEG compression.

Further, the original image data may be configured as JPEG data. According to this configuration, it is possible to certify whether the original image is the barcode area based on JPEG compressed data.

Furthermore, the output unit may be configured such that printing is performed using a larger dot when printing an area indicated to be the barcode area than when printing an area indicated not to be the barcode area. According to this configuration, it is possible to perform printing so that the barcode present in the barcode area does not blur, and it is possible to improve the reading accuracy of the reader as compared with the case where the dot size is not adjusted.

Furthermore, the output unit may be configured such that printing is performed with a lower concentration with respect to the original image with an identical concentration when printing an area indicated to be the barcode area than when printing an area indicated not to be the barcode area. According to this configuration, it is possible to perform printing so that the barcode present in the barcode area does not blur, and it is possible to improve the reading accuracy of the reader as compared with the case where the density is not adjusted.

Furthermore, the area information may be configured to be 1-bit information per block. According to this configuration, it is possible to express whether the original image is the barcode area with a very small amount of information.

Further, the area information may be configured to be information continuous to data indicating contents of the block in the output image data. According to this configuration, it is not necessary to manage the area information alone, and it is easy to mange the information.

DESCRIPTION OF EXEMPLARY EMBODIMENTS

Here, embodiments of the present disclosure will be described in the following order.
1. Configuration of image output device:
2. Copy processing:
3. Candidate block determination processing:
4. Barcode area certification process:
5. Other embodiments:

1. Configuration of Image Output Device

Figure 1:
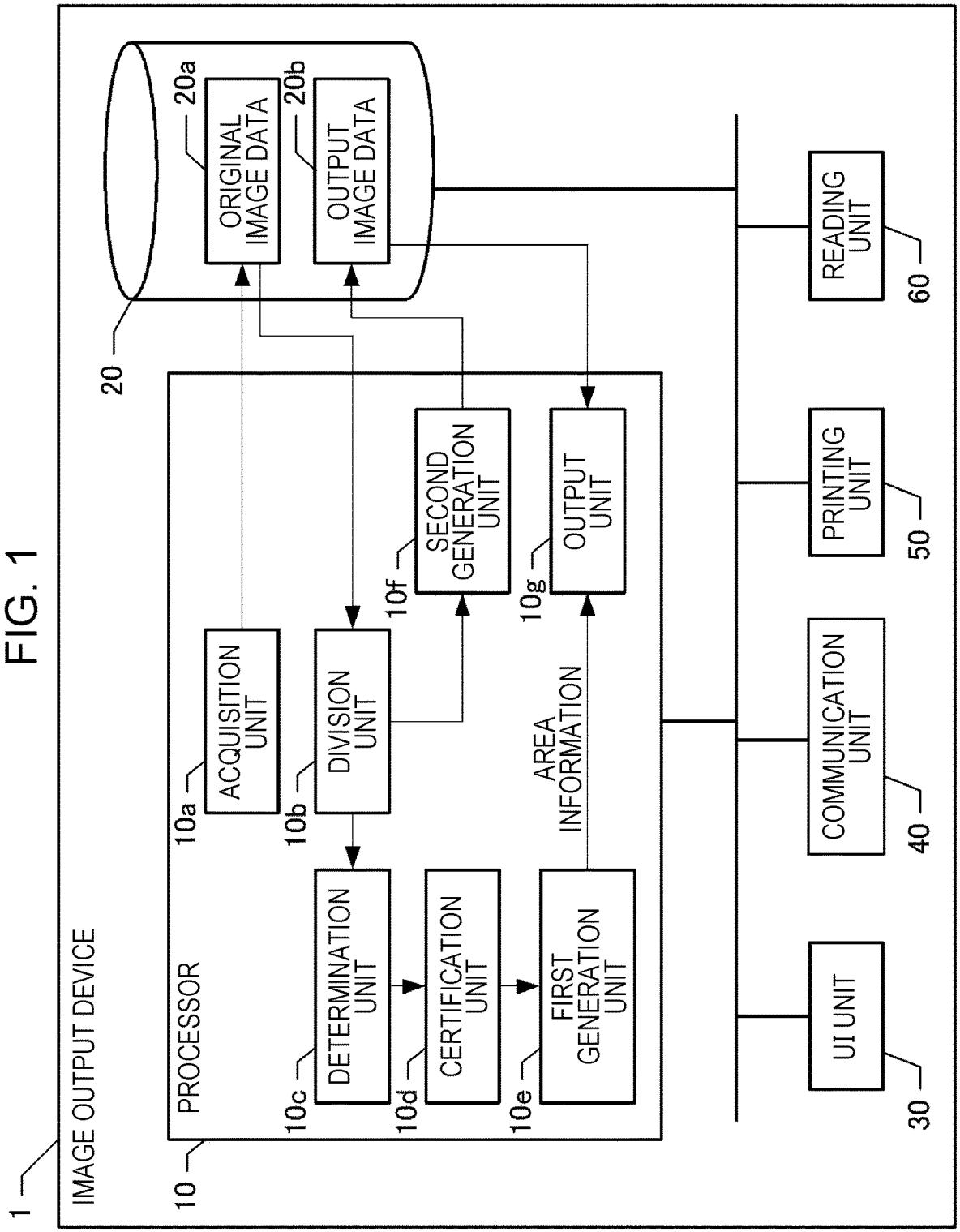
FIG. 1 is a block diagram of an image output device.

FIG. 1 is a block diagram showing a configuration of an image output device 1 according to an embodiment of the present disclosure. The image output device 1 includes a processor 10, a memory 20, a user interface (UI) unit 30, a communication unit 40, a printing unit 50, and a reading unit 60.

The UI unit 30 includes a touch panel display and a key input unit. The display includes a display panel and a touch detection panel overlaid on the display panel. The display displays various information on the display panel based on the control of the processor 10. Further, the display accepts a touch input to the touch detection panel. The key input unit accepts input to keys such as a power button, a start button, a cancel button, and a numeric button. When an input is accepted on the touch panel or the key input unit, information indicating the accepted input contents is output to the processor 10.

The communication unit 40 includes a removable memory and a communication interface circuit for communicating with external devices according to various communication protocols. The printing unit 50 includes an actuator, a sensor, a drive circuit, a machine component, and the like for performing printing on various print media by an ink jet method. That is, the printing unit 50 is capable of discharging a K (black) ink and chromatic color inks (for example, a C (cyan) ink, a M (magenta) ink, a Y (yellow) ink, and the like) to the print medium, and form a color image or a monochrome image on the print medium. Of course, the color and the number of inks are only examples, and in another example, dark and light inks of similar colors may be used.

In the present embodiment, the printing unit 50 can eject inks with plurality of dot sizes from the ink nozzles. The number of the dot sizes may be two or more. Here, for the sake of simplicity, it is assumed that two types of inks with a large dot size and a small dot size can be used. In the present embodiment, the printing unit 50 can accumulate print media in each of a plurality of trays. The printing unit 50 has a transport mechanism that selects print media one by one which are accumulated in each tray, transports the transport media in the transport path, and discharges the printed print media in the transport process. In the present embodiment, printing can be performed on different sizes of print media by accumulating print media of the same size in each tray.

The reading unit 60 includes a document table, a light source, a sensor, a carriage, a transport mechanism (not shown) for reciprocating the carriage along a predetermined direction, and the like. That is, the reading unit 60 can perform scanning in which light is radiated from the light source onto a document placed on a document table while moving the carriage, the light from the document is read by a sensor and original image data indicating the reading result is acquired.

The processor 10 includes one or more of CPUs, RAMS, and the like, and implements various functions of the image output device 1 by executing various programs recorded in the memory 20. For example, the processor 10 can acquire the input contents by the user based on the information acquired from the UI unit 30, and can execute processing corresponding to the input content. Further, the processor 10 controls the reading unit 60 in accordance with a document reading instruction to cause the reading unit 60 read the document. Further, the processor 10 controls the reading unit 60 to cause the reading unit 60 to read the document, and controls the printing unit 50 to cause the printing unit 50 to print the read image on the print medium in accordance with an instruction to copy the document. Of course, the image output device 1 may be controlled by an external device (for example, another computer or a portable terminal) coupled to the image output device 1 via the communication unit 40.

While the purpose of the copy function is to print the contents same as those of the document, the appropriate printing method varies depending on the contents of the document, so that the processor 10 analyzes the contents of the document read by the reading unit 60, and controls the printing unit 50 so that the printing unit 50 performs printing by a method according to the contents of the document. That is, when the document includes a color photograph, the processor 10 causes the printing unit 50 to print the color photograph in a state where the respective CMYK inks can be used. When the document includes black characters, the processor 10 sets the character area in a state where only K ink can be used, and causes the printing unit 50 to print black characters.

When the document includes the barcode, the processor 10 uses the K ink for the barcode area, and further causes the printing unit 50 to perform printing on the barcode area in a state where the ink recording density is lower than that when performing normal printing. In a portion other than the barcode area, the ink is selected depending on whether the portion is a photo area or a character area, and printing is performed by the printing unit 50.

As described above, the image output device 1 according to the present embodiment lowers the ink recording density in the barcode area, compared with the area where normal printing is performed. This suppresses ink bleeding and makes it easier to recognize the barcode. The processor 10 performs such printing by executing an image output program (not shown). When the image output program is executed, the processor 10 functions as an acquisition unit 10*a*, a division unit 10*b*, a determination unit 10*c*, a certification unit 10*d*, a first generation unit 10*e*, a second generation unit 10*f*, and an output unit 10*g*.

The acquisition unit 10*a* has a function of acquiring original image data indicating an original image. That is, the user sets a document including a barcode on the document table of the reading unit 60. When the user instructs the start of the copy function by operating the UI unit 30, the processor 10 controls the reading unit 60 by the function of the acquisition unit 10*a* to cause the reading unit 60 to read the document. The processor 10 records the data acquired by the reading in the memory 20 as original image data 20*a*. In the present embodiment, the read result is the original image data 20*a*, and the image read for copying is the original image. As described above, the image output device 1 according to the present embodiment functions as a scanner when the processor 10 functions as the acquisition unit 10*a* and controls the reading unit 60.

The division unit 10*b* has a function of dividing the original image data 20*a* into blocks. That is, the processor 10 refers to the memory 20 and acquires the original image data 20*a*. The processor 10 divides the original image data 20*a* into image data each piece of which corresponds to one block having a predetermined size. The block used for division in the present embodiment is the same as the block used for JPEG compression. That is, in JPEG compression, in many cases, an image is divided into images each of which corresponds to one block having any one of sizes of 8×8 pixels, 16×16 pixels, 16×8 pixels, and 8×16 pixels. In this embodiment, it is assumed that the image is divided into images each of which corresponds to one block having a size of 16×16 pixels. Since the division by the division unit 10*b* is part of JPEG compression process, the processor 10 divides the original image into images each of which corresponds to one block having any one of these sizes by the function of the division unit 10*b*. The divided image data is recorded in a RAM (not shown).

The determination unit 10*c* has a function of determining whether each block acquired by dividing the image is a candidate block that is a candidate for a block in the barcode area. That is, the processor 10 identifies a block that may be a barcode area from among the blocks divided by the division unit 10*b* by the function of the determination unit 10*c*, and regards the identified block as a candidate block. A block that is not a candidate block is a non-black character area. In the present embodiment, the non-black character area is a color photograph or a monochrome photograph, but may, of course, be an area including a picture such as a color or monochrome.

In the present embodiment, the candidate block is a block in which the number of monochrome edges (achromatic edges) is equal to or larger than a threshold value, or a block in which no color edge (chromatic edge) is present and whose adjacent block is a candidate block (details will be described later). That is, the barcode in the present embodiment is a one-dimensional barcode, and the barcode is composed of a plurality of black straight lines.

Accordingly, the barcode area including the barcode has no color edge, and has relatively many monochrome edges. Therefore, it can be estimated that such a block may be a barcode area. However, since such a feature appears even in a black character, it cannot be determined that the block is the barcode. Therefore, the present embodiment has a configuration which a block including an object having such a feature is regarded as a candidate block, and it is certified whether the object is the barcode or a black character by further analysis.

The certification unit 10*d* has a function of certifying, as a barcode area, an area in which candidate blocks continue by a first threshold value or more in the first direction and are arranged by a second threshold value or more in a second direction orthogonal to the first direction. That is, the one-dimensional barcode has a black portion that continues in a direction parallel to the straight line constituting the barcode, and has the straight lines discretely in a direction perpendicular to the straight lines constituting the barcode. Therefore, in a case where the direction substantially parallel to the straight line constituting the barcode is the first direction, it can be estimated that when candidate blocks continue in the first direction, the blocks may include a straight line constituting the barcode. The first threshold value is a value set in advance as a numerical value that allows the number by which the candidate blocks continue in the first direction to be regarded as appropriate as a barcode.

Further, in the direction perpendicular to the straight line constituting the barcode, the straight line has a width, and in the present embodiment, the width of the straight line is approximately equal to or more than the size of one candidate block. Further, in the direction perpendicular to the straight lines constituting the barcode, the straight lines are present discretely and relatively densely. Therefore, the candidate blocks can be present continuously in a direction perpendicular to the straight line constituting the barcode, and the candidate blocks can continue with a small number of non-candidate blocks sandwiched between the candidate blocks. For this reason, it can be estimated that when the candidate blocks continue in a direction perpendicular to the straight line constituting the barcode, the blocks may include the straight line constituting the barcode. The second threshold value is a value set in advance as a numerical value that allows the number by which the candidate blocks continue in the second direction to be regarded as appropriate as a barcode.

Details will be described later, but by performing the above processing, the processor 10 of the present embodiment certifies, when the candidate block is presumed to be a block that can include the barcode, the block as a barcode area. On the other hand, when the candidate block is not a block that can include the barcode, the processor 10 certifies the block as a black character area.

The first generation unit 10*e* has a function of generating area information which indicates whether the original image is the barcode area where the area information associated with each of the blocks. In the present embodiment, each block is classified into a non-black character area (color photograph or monochrome photograph), a black character area, and a barcode area, so that the processor 10 generates information indicating the classification. That is, the processor 10 generates information indicating whether each block is a non-black character area or whether each block is a black character area to associate the information with each block. Further, the processor 10 generates information indicating whether each block is the barcode area, and associates the information with each block.

In the present embodiment, the information indicating whether each block is a non-black character area, whether each block is a black character area, or whether each block is the barcode area is 1-bit information (flag). In the present embodiment, information indicating whether the block is a barcode area is referred to as area information. The processor 10 associates each block with information indicating whether the block is a non-black character area or information indicating whether the block is a black character area, and then associates each block with the area information. Therefore, in the present embodiment, the area information is information that is continuous with data indicating the contents of the block in the output image data (information indicating whether the block is a non-black character area, or information indicating whether the block is a black character area). With this configuration, it is not necessary to manage the area information independently of other information relating to the block.

The second generation unit 10*f* has a function of generating, as output image data, JPEG data acquired by compressing the original image data 20*a* for each block. That is, the image output device 1 according to the present embodiment has a function of saving the read image as output image data 20*b* compressed with JPEG. In the present embodiment, the processor 10 performs, by the function of the second generation unit 10*f*, compression on each block that is the same as the block that is a unit for determining whether the block is the barcode area. That is, the processor 10 performs discrete cosine transform on each block obtained by performing division by the function of the division unit 10*b*. Further, the result of the discrete cosine transform is quantized and compressed using a Huffman code. The compressed data is made into one file data and is recorded in the memory 20 as the output image data 20*b*.

The output unit 10*g* has a function of performing output based on output image data. That is, the processor 10 refers to the output image data 20*b* and uncompresses JPEG compressed data. Furthermore, based on the uncompressed image data, the processor 10 generates control data for causing the printing unit 50 to print the image indicated by the image data. The processor 10 controls the printing unit 50 to cause the printing unit 50 to print the image.

In the present embodiment, when the control data is generated based on the image data, printing can be performed by a different method for each block. That is, the processor 10 identifies the contents of each block based on the information associated with the block (information indicating whether the block is a non-black character area, information indicating whether the block is a black character area, or area information indicating whether the block is a barcode area). The image processing different between each content according to the contents of each block is performed. As a result, printing is performed by a different method depending on the contents of each block.

Specifically, in a case where the block is associated with information that is a non-black character area, the processor 10 performs conversion in a state in which each ink of CMYK can be used when converting each pixel in the block into an ink dot representation. Further, in a case where the block is associated with information that is a black character area, the processor 10 performs conversion in a state in which only K ink is used when converting each pixel in the block into an ink dot representation.

Furthermore, in a case where the block is associated with information indicating that the block is the barcode area, the processor 10 performs a process similar to that for the black character area to convert each pixel in the block into an ink dot representation in a state in which only K ink is used. In addition to the conversion, the processor 10 converts each ink dot into a small dot. The conversion may be performed so that the dot when printed in the black character area may be larger than the dot when printed in the barcode area. For example, when a configuration is such that printing can be performed using two types of dots, the large dot and the small dot, the configuration may be such that the processor 10 converts, into a small dot, a dot that has been converted into a large dot by processing similar to the processing in the black character area. Of course, dots to be converted into the small dot may be all the dots in the block or may be part of them.

When the control data is generated as described above, the processor 10 controls the printing unit 50 to cause the printing unit 50 to print the image indicated by the output image data 20b. According to the above configuration, in the present embodiment, printing is performed using methods that are different between an area indicated, by the area information, to be the barcode area, and an area indicated not to be the barcode area (non-black character area or black character area). While the configuration has been described in which the color of ink that can be used and the size of the printed dots change depending on the contents of each block, of course, another image processing may be different. For example, the color conversion table, gamma correction parameters, or the like may be different.

In the present embodiment as described above, it is certified whether the original image is the barcode area based on the block used for JPEG compression. Therefore, the result of processing performed in JPEG compression can be used, and it can be certified, by the simple process without performing complicated processing, whether the original image is the barcode. For this reason, advanced hardware resources are not required for certification of whether the original image is the barcode.

In the present embodiment, the image is divided into a plurality of blocks, and whether the original image is the barcode area for each block is certified. Since the block is a block used for JPEG compression, the number is smaller than the number of pixels of the image. Accordingly, it is possible to determine whether a small number of blocks are the barcode area, and the barcode area can be specified based on a small number of determinations.

Further, in the present embodiment, it is possible to identify the candidate block to be certified as to whether the block is a barcode area by using the result of determination of whether the block is a black character area where the determination is also performed in normal printing. Therefore, it is possible to simplify the process of certifying whether the block is the barcode area. Furthermore, in the present embodiment, it is possible to certify whether the candidate block is the barcode area based on the number of the candidate blocks arranged vertically and horizontally. Therefore, it is possible to certify whether the block the barcode area by a very simple process.

The area information indicating whether the block is the barcode area is described by 1-bit information for each block. Accordingly, when the number of horizontal pixels is Px and the number of vertical pixels is Py of the original image data 20a, and the number of horizontal pixels is Bx and the number of vertical pixels is By of the block, it is possible to express the area information by (Px/Bx)×(Py/By) bits. For this reason, the area information can be described in a very small amount as compared with the original image data 20a, and it is possible to suppress the capacity of the storage medium required for recording whether the area is the barcode area.

Further, in the present embodiment, it is possible to perform control to print the barcode in the barcode area only by setting the dot size to a small dot. Therefore, the printing method in the barcode area can be specified with a very simple configuration. When an object to be printed in the barcode area is printed with small dots, the object may appear thin, compared with the case in which black characters or the like other than the barcode are printed on the print medium as a result of printing, but the possibility of blurring of the object as the result of printing is reduced, so that the reading accuracy of the barcode reader can be improved. That is, the barcode printed with small dots can have a reduced false recognition rate as the result of printing by the barcode reader, compared with the barcode printed with large dots.

2. Copy Processing

Next, the copy processing procedure will be described with reference to the flowchart shown in FIG. 2. When the user places a document on the document table and gives a instruction of the scan through the UI unit 30, the processor 10 accepts the scan instruction and starts the copy processing shown in FIG. 2. When the copy processing is started, the processor 10 controls the reading unit 60 with the function of the acquisition unit 10a to cause the reading unit 60 to read the document (step S100).

That is, the processor 10 sets the black level and the white level based on the black reference and the white reference, and sets the gain. The processor 10 turns on the light source and performs reading by the sensor while performing scanning by the carriage. When the reading is performed, the processor 10 acquires the original image data 20a indicating the reading result by the function of the acquisition unit 10a and records the acquired original image data 20a in the memory 20.

Next, the processor 10 divides the original image into a plurality of blocks by the function of the division unit 10b (step S110). That is, the processor 10 selects a size to be used for processing from a predetermined size (for example, 8×8 pixels) that can be selected as a block size for JPEG compression, and divides the original image by the size. The size may be selected by various methods, may be determined in advance, may be determined by the user, or may be determined by the size of the original image or the like.

Next, the processor 10 generates JPEG data by the function of the second generation unit 10f (step S120). In other words, the processor 10 performs discrete cosine transform on each of the blocks of the divided image data, quantizes them, and compresses them using a Huffman code. The generated JPEG data is recorded in the memory 20 as the output image data 20b. The generation of the JPEG data in step S120 may be performed after the generation of area information (step S150 described later), or may be performed in parallel with the generation.

With respect to details of the generation of the JPEG data, a general JPEG data generation method may be used, but the method may be such that the type of block to be processed is determined, and the process is performed according to the determination result for each block. For example, in the process, it is determined whether the block is blank and blank block compression processing is performed on the blank block, the type of image data in the block is determined for a plurality of types of image data including a character or a photograph based on the number of color edges and the number of monochrome edges for each block, unnecessary components of the image data are identified according to the type, and a compression process of suppressing or eliminating the identified unnecessary components is performed to increase the compression rate while maintaining good image quality. The result of the process performed in such JPEG data generation processing can be used in the determination on the candidate block (step S130 to be described later), making it possible to perform a simple process.

Next, the processor 10 performs determination on a candidate block by the function of the determination unit 10c (step S130). That is, for each block obtained by the function of the division unit 10b, when the block is determined to be a non-black character area, the processor 10 excludes the block from a candidate block, and when it is estimated that the area is a black character area or a barcode area, the processor 10 determines that the block is a candidate block. The block that is not determined to be a candidate block is a non-black character area, and the processor 10 records, in the RAM, the block in association with information indicating whether the block is a non-black character area. Details of step S130 will be described later.

Next, the processor 10 certifies the barcode area by the function of the certification unit 10d (step S140). That is, the processor 10 certifies whether each of the blocks regarded as candidate blocks in step S130 is the barcode area based on a predetermined criterion. The candidate block that is not determined to be a barcode area is a black character area, and the processor 10 records, in the RAM, the candidate block in association with information indicating whether the candidate block is the black character area. Further, the processor 10 records, in the RAM, the candidate block, determined to be the barcode area, in association with information indicating whether the candidate block is the barcode area. Details of step S140 will be described later.

Next, the processor 10 generates area information by the function of the first generation unit 10e (step S150). That is, in step S140, the candidate block that is not certified as a barcode area is regarded as a black character area, and the processor 10 associates the candidate block with information indicating whether the candidate block is the black character area. In step S140, the processor 10 associates the candidate block that is certified as a barcode area with 1-bit area information indicating whether the candidate block is the barcode area. Information indicating whether the block is a non-black character area, information indicating whether the block is a black character area, and area information indicating whether the block is a barcode area are described as continuous data.

Next, the processor 10 performs output by the function of the output unit 10g (step S160). That is, the processor 10 refers to the output image data 20b and uncompresses JPEG compressed data. Furthermore, based on the uncompressed image data, the processor 10 generates control data for causing the printing unit 50 to print the image indicated by the image data. At this time, the processor 10 refers to information indicating whether the block is a non-black character area, information indicating whether the block is a black character area, and area information indicating whether the block is a barcode area to determine the contents of the image processing.

That is, when the block is associated with information indicating that the block is a non-black character area, the processor 10 performs color conversion with the ink to be used as CMYK ink. When the block is associated with information indicating that the block is a black character area, the processor 10 performs color conversion with the ink to be used as K ink. Further, when the block is associated with information indicating that the block is the barcode area, the processor 10 performs color conversion with the ink to be used as K ink, and performs a process of determining the size of the dots. When the dots include a dot larger than the smallest dot, the processor 10 performs the process of converting the dot into the smallest dot. When the process including such image processing is performed, the processor 10 controls the printing unit 50 based on the processing result to cause the printing unit 50 to print the image indicated by the output image data 20b.

3. Candidate Block Determination Processing

Next, the procedure of candidate block determination processing in step S130 will be described with reference to the flowchart shown in FIG. 3. Here, the description will be given with reference to the document as shown in FIG. 4. In the example shown in FIG. 4, the original image includes a human photograph P on the left side of a rectangular frame, a barcode Bc on the upper right side, and a character C on the lower right side. In FIG. 4, a portion expressed in black in the original image is shown in black, and a portion expressed in chromatic color in the original image is shown in gray. Therefore, in the example shown in FIG. 4, the photograph P is a color photograph expressed in chromatic colors, and includes a relatively large black portion Pk. The barcode Bc is expressed in black. The character C includes characters expressed in black and characters expressed in chromatic colors.

Figure 3:
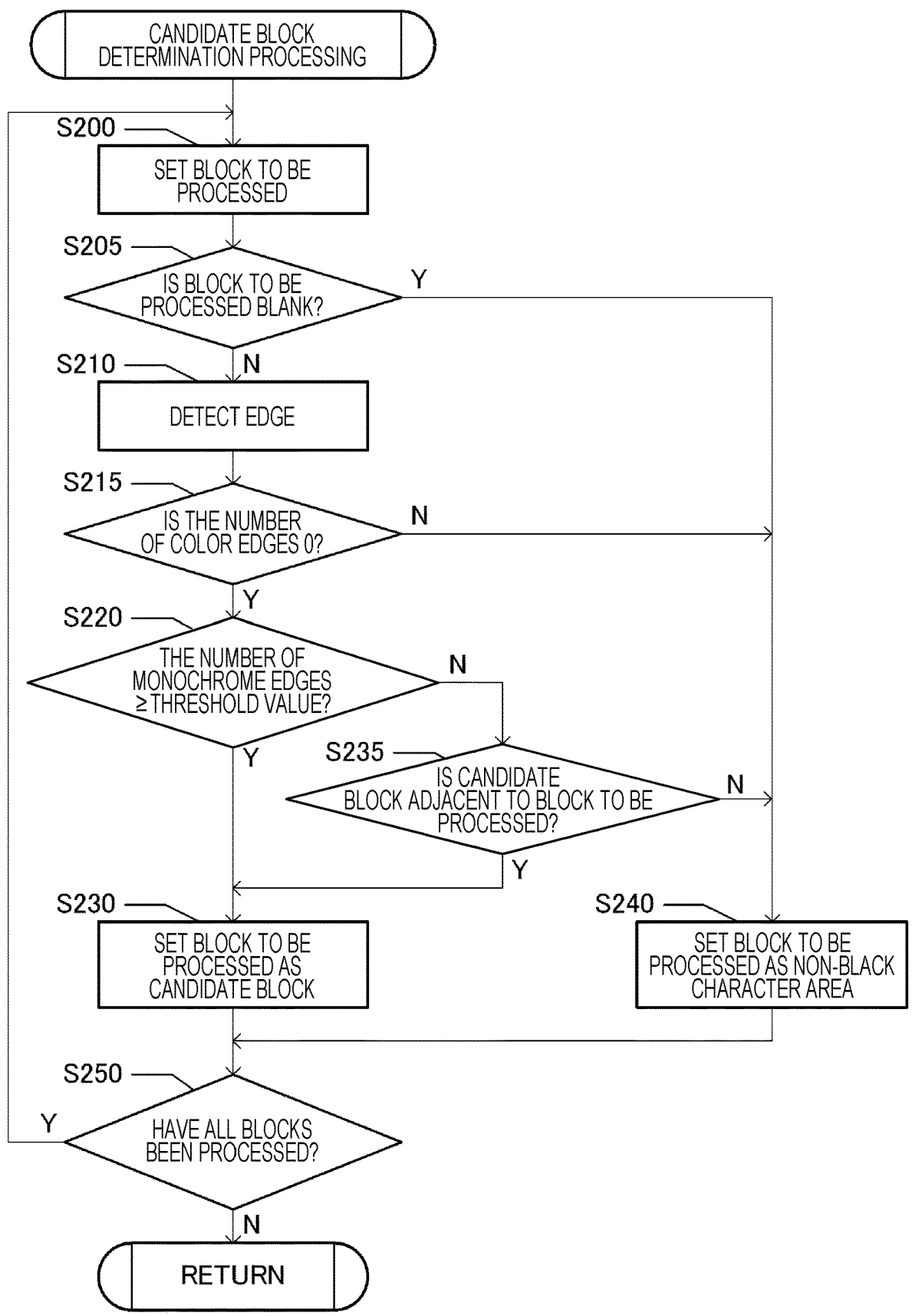
FIG. 3 is a flowchart of candidate block determination processing.
Figure 4:
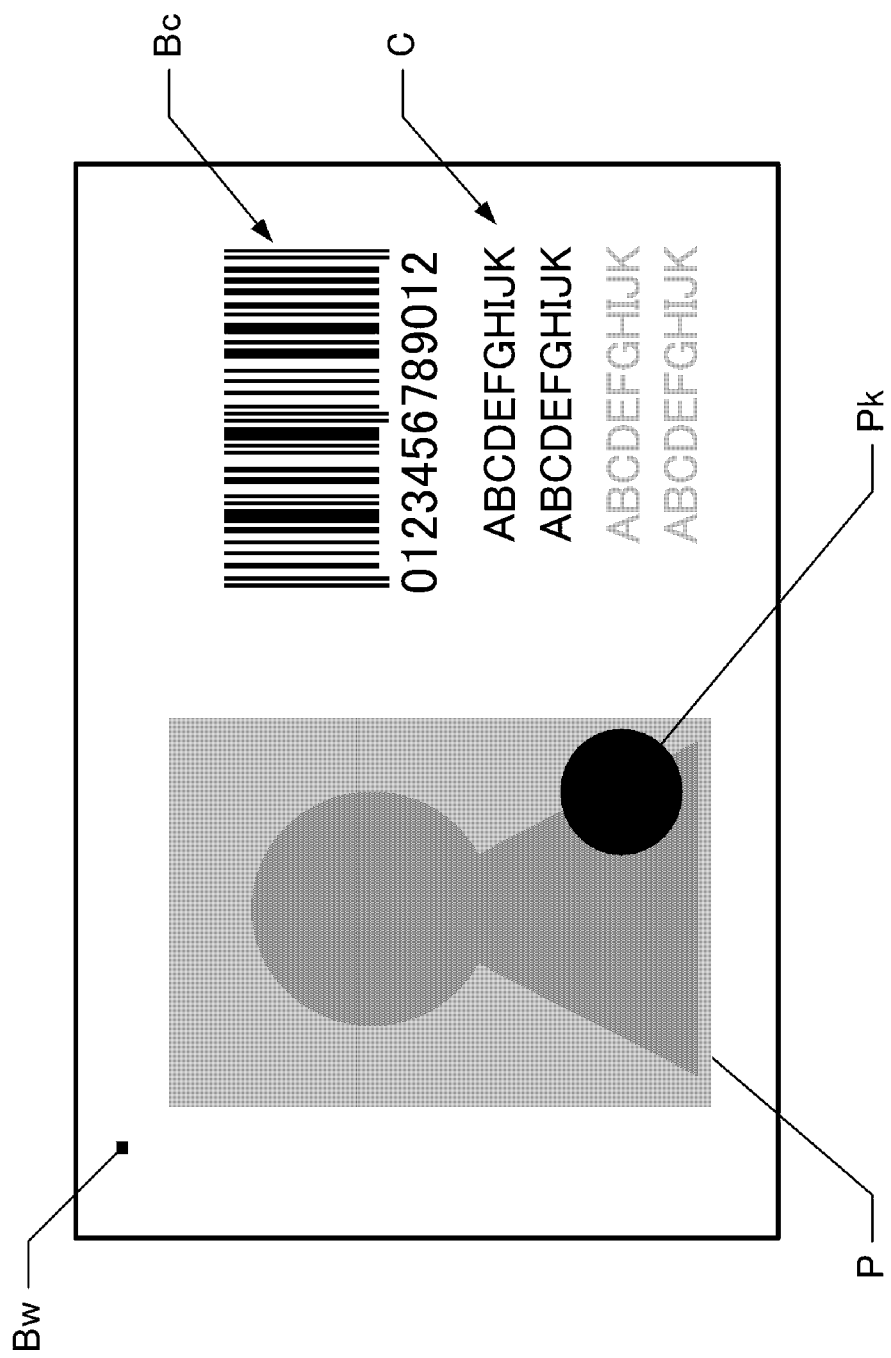
FIG. 4 is a diagram illustrating an example of a read image.

When the candidate block determination processing shown in FIG. 3 is started, the processor 10 sets a block to be processed (step S200). That is, the processor 10 selects one block on which the determination on the candidate block has not been performed from among a plurality of blocks acquired in step 110, and sets the selected block to a block to be processed.

Next, the processor 10 determines whether the block to be processed is blank (step S205). In the present embodiment, the range of gradation values that can be considered white is predetermined. When the gradation values of all the pixels included in the block to be processed are included in the range, the processor 10 determines that the block to be processed is blank. For example, when the block to be processed is the block Bw that is present in the white background portion shown in FIG. 4, the block Bw is white, so that it is determined that the block is blank. The block including the photo P and the barcode Bc has a range in which the gradation values of at least some of the pixels are out of the range, so that it is not determined that the block is blank.

When it is determined in step S205 that the block to be processed is blank, the processor 10 sets the block to be processed to a non-black character area (step S240). That is, the processor 10 records, in the RAM, the block to be processed in association with information indicating that the block is a non-black character area.

When it is not determined in step S205 that the block to be processed is blank, the processor 10 performs the edge detection (step S210). In the present embodiment, it is determined whether the block to be processed is included in the barcode area using the color edge and the monochrome edge. The processor 10 converts the gradation value for each pixel of the block to be processed into the YUV color space (the process can be omitted when the original image data 20*a* is expressed in the YUV color space instead of the RGB color space). An edge detection filter is applied to each of the Y, U, and V components to detect edge pixels. The edge detection filter may be various filters, and a Laplacian filter, a Sobel filter, a Prewitt filter, or the like can be used. Of course, the color space after conversion is not limited to the YUV color space, but may be the YCbCr color space or the YPbPr color space.

Next, the processor 10 determines whether the number of color edges in the block to be processed is 0 (step S215). Here, the color edge is an edge of the U component and an edge of the V component, and the number of color edges is the sum of the numbers of both edges. That is, in the YUV color space, a portion can be regarded as a chromatic color when the U component and the V component are non-zero, and the size is significant. Therefore, the edges of the U component and the V component indicate the edges of the portion expressed in chromatic colors.

Therefore, the processor 10 counts the sum of the edges of both components, and when the sum of the edges of both components is not 0, the processor 10 regards the block to be processed as a block including a portion in chromatic color. When it is not determined in step S215 that the number of color edges in the block to be processed is 0, the processor 10 executes step S240, and sets the block to be processed to the non-black character area. For example, the number of color edges does not become zero in the chromatic color portion of the photograph P shown in FIG. 4, so the block to be processed including the photograph P is set to the non-black character area. Even when a relatively large black portion Pk is included in the photograph P, a color edge is present in the line indicating the periphery of the black portion Pk, so that the block to be processed including the line indicating the periphery of the portion Pk is set to the non-black character area.

On the other hand, when it is determined in step S215 that the number of color edges in the block to be processed is 0, the processor 10 determines whether the number of monochrome edges is equal to or larger than a threshold value (step S220). Here, the monochrome edge is the edge of the Y component. The monochrome edge appears at the edge of a black character expressed in black and the edge of a barcode expressed in black. In the present embodiment, the lower limit value of the number of monochrome edges when an object present in the block is a black character or a barcode value is statistically identified and defined as a threshold value. Therefore, when the number of monochrome edges is equal to or larger than the threshold value, it can be determined that the block to be processed is a black character area or a barcode area.

Figure 5:
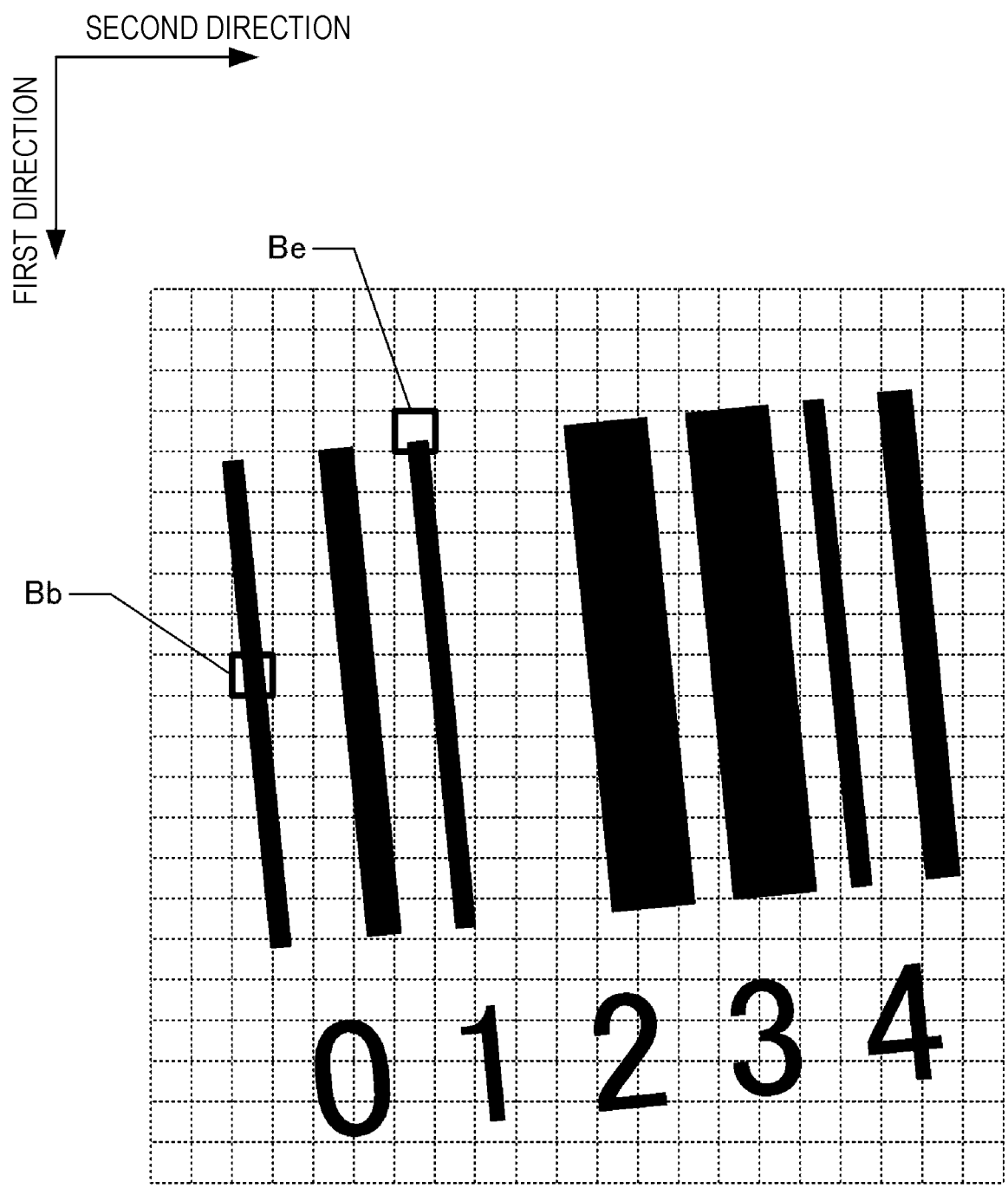
FIG. 5 is a diagram illustrating an example of a barcode and a block.

FIG. 5 is a diagram showing black characters and a barcode together with blocks. In FIG. 5, a broken line indicates a block boundary. In the example shown in FIG. 5, the barcode and the black characters (numbers) are slightly inclined with respect to the sides of the block. As shown in FIG. 5, the Black lines that make up the barcode and the black characters are larger than a block, and the black line or black character is present along the entire length of the block in the vertical direction or the horizontal direction in many of the blocks where the black lines and the black characters are present (for example, the block Bb). Therefore, when the lower limit value of the number of edges formed by the black line or the black character in such a state is used as a threshold value, it can be determined whether the block is a black character area or a barcode area.

Therefore, when it is determined in step S220 that the number of monochrome edges is equal to or larger than the threshold value, the processor 10 sets the block to be processed to a candidate block (step S230). That is, the processor 10 records, in the RAM, the block to be processed in association with information indicating that the block is a candidate block.

On the other hand, when it is not determined in step S220 that the number of monochrome edges is equal to or larger than the threshold value, the processor 10 determines whether the candidate block is adjacent to the block to be processed (step S235). That is, when the block to be processed includes an end portion of a barcode, an end portion of a black character, a punctuation mark of a black character, and the like, but does not include another object, the number of monochrome edges may be less than the threshold value. For example, the number of monochrome edges can be equal to or less than the threshold value in the block Be shown in FIG. 5.

However, in this case, there should be a block that is adjacent to the block to be processed and that includes a black character or a barcode. Therefore, when there is a candidate block adjacent to the block to be processed, it can be estimated that the block to be processed can also include the black character or the barcode. Therefore, when it is determined in step S235 that the candidate block is adjacent to the block to be processed, the processor 10 sets the block to be processed to a candidate block in step S230.

On the other hand, when it is not determined in step S235 that the candidate block is adjacent to the block to be processed, the processor 10 executes step S240 and sets the block to be processed to a non-black character area. For example, as shown in FIG. 4, when a relatively large black portion Pk is included in the photograph P, the block inside the black portion Pk (block that do not include the periphery of the black portion Pk) has a small number of monochrome edges because the block is uniformly black. Accordingly, step S235 is executed after the determination in step S220, and no candidate block is present around the block to be processed, so that the block is set to a non-black character area in step S240.

In step S230 or step S240, when the block to be processed is set to a candidate block or non-black character area, the processor 10 determines whether the process has been completed for all blocks (step S250). That is, the processor 10 determines that the process has been completed for all blocks when steps S200 to S240 have been executed for all of the blocks divided in step S110. When it is not determined in step S250 that the process has been completed for all the blocks, the processor 10 repeats the process of step S200 and its subsequent steps. On the other hand, when it is determined in step S250 that the process has been completed for all blocks, the candidate block determination processing is terminated, and the process returns to the process illustrated in FIG. 2.

4. Barcode Area Certification Process

Figure 6:
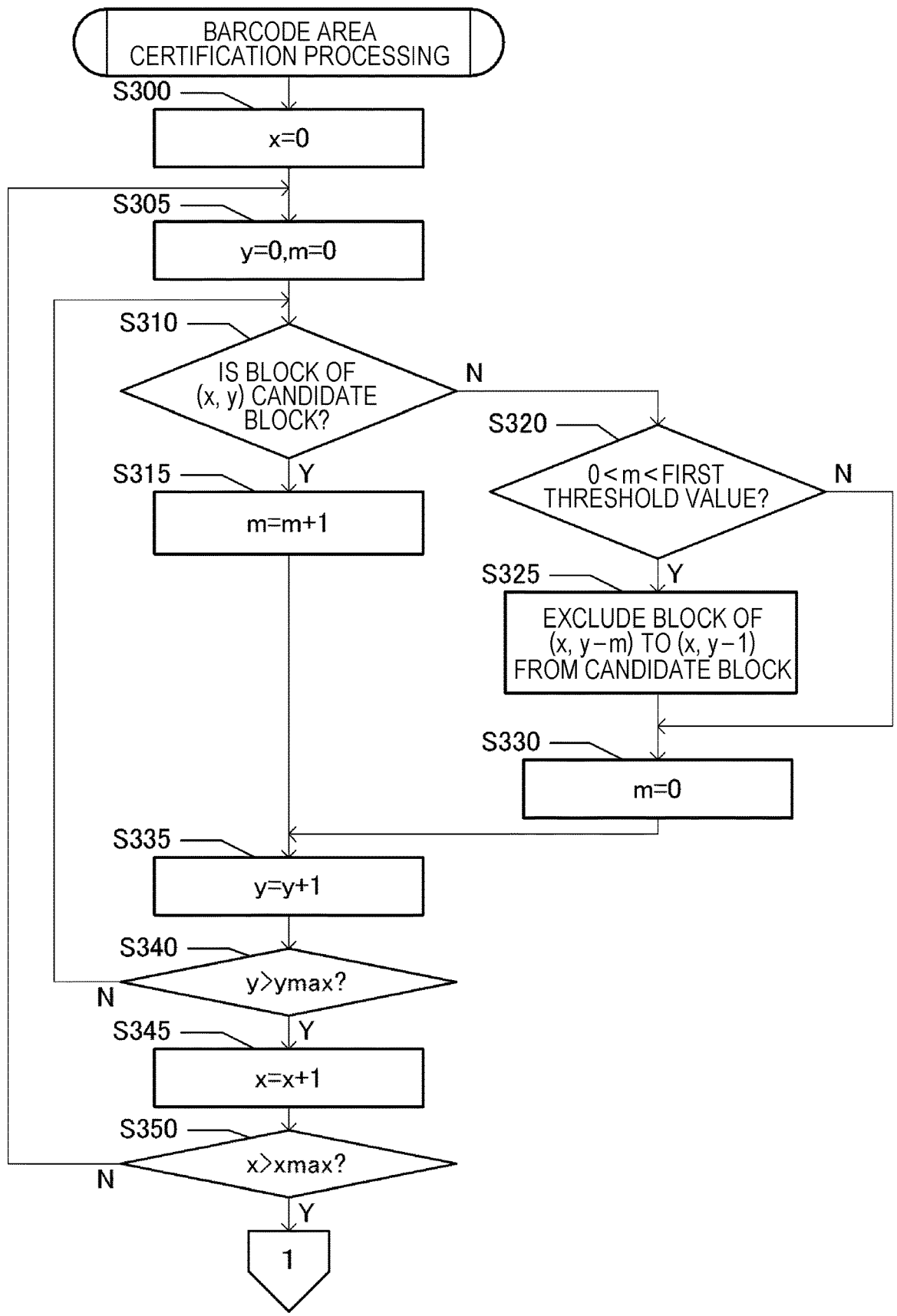
FIG. 6 is a flowchart of barcode area certification processing.

Next, the procedure of the barcode area certification process in step S140 will be described with reference to the flowcharts shown in FIGS. 6 to 8. In the barcode area certification process, the processor 10 introduces an orthogonal coordinate system indicating the arrangement of blocks. The axes of the orthogonal coordinate system are parallel to the side of the block, and one is the first direction and the other is the second direction.

FIG. 5 shows the first direction and the second direction. In this example, the first direction represents the axis whose value increases from top to bottom, and the second direction represents the axis whose value increases from left to right. Here, the coordinate in the first direction is expressed as the y coordinate, and the coordinate in the second direction is expressed as the x coordinate. Therefore, the upper left block is the block at the coordinates (x, y)=(0, 0), the block located below the block at the coordinates (0, 0) by one block is the coordinates (0, 1), and the block located right of the block at the coordinates (0, 0) by one block is the coordinates (1, 0).

In such a coordinate system, the processor 10 initializes a coordinate value x indicating the position of the candidate block in the second direction to 0 (step S300). Further, the processor 10 initializes a coordinate value y indicating the position of the candidate block in the first direction to 0, and initializes a variable m for counting the number of consecutive candidate blocks in the first direction to 0 (step S305).

Next, the processor 10 determines whether the block at the coordinates (x, y) is a candidate block (step S310). That is, in the present embodiment, all candidate blocks are processed while changing the coordinate value y in the first direction and the coordinate value x in the second direction. Therefore, the processor 10 determines whether the block indicated by the current coordinate value (x, y) is a candidate block.

Figure 9:
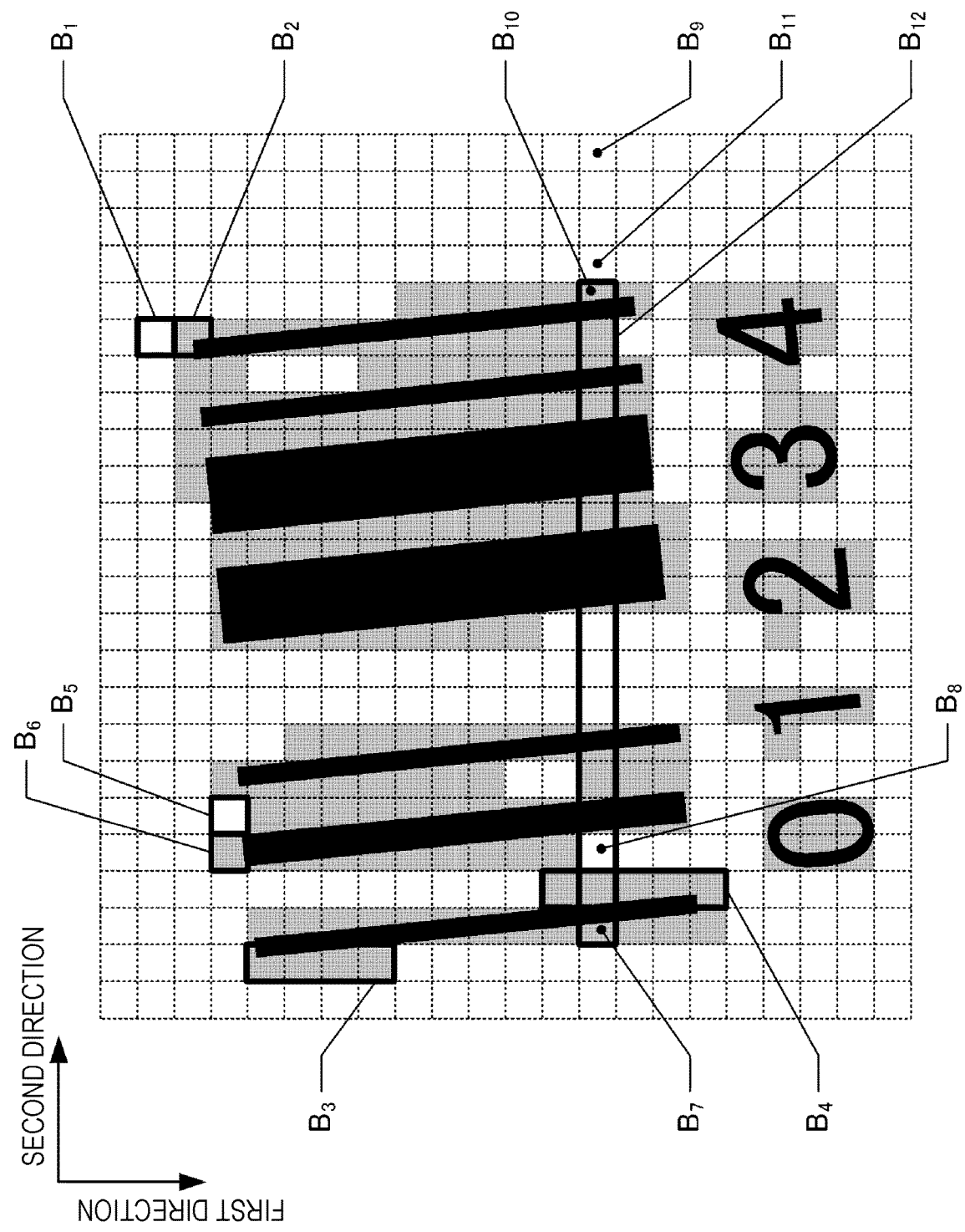
FIG. 9 is a diagram showing an example of barcode area certification.

FIG. 9 is a diagram illustrating a result of the determination in step S130 in the same example as the example illustrated in FIG. 5. That is, the blocks determined to be a candidate block in FIG. 5 are shown in gray. In this example, for example, when the block to be processed is the block $B_1$, in step S310, it is not determined that the block at the coordinates (x, y) is a candidate block. On the other hand, when the block to be processed is the block $B_2$, it is determined in step S310 that the block at the coordinates (x, y) is a candidate block.

When it is determined in step S310 that the block at the coordinates (x, y) is a candidate block, the processor 10 increments the variable m (step S315). That is, the processor 10 increases the number of consecutive candidate blocks in the first direction by one.

On the other hand, when it is not determined in step S310 that the block at the coordinates (x, y) is a candidate block, the processor 10 determines whether the variable m is larger than 0 and smaller than the first threshold value (step S320). That is, when m is larger than 0, one or more candidate blocks are present in the first direction. When m is smaller than the first threshold value, the number of consecutive candidate blocks is less than the first threshold value. For this reason, when the variable m is larger than 0 and smaller than the first threshold value, one or more candidate blocks are present in the first direction, but do continue by the first threshold value or more, so that the processor 10 temporarily estimates that these candidate blocks are not the barcode.

For this reason, when it is determined in step S320 that the variable m is larger than 0 and smaller than the first threshold value, the processor 10 excludes the blocks from at the coordinates (x, y-m) to at the coordinates (x, y-1) from the candidate block (step S325). In the process, when the first threshold value is, for example, 5, for example, the block group $B_3$ is temporarily excluded from the candidate block, but the block group $B_4$ is not excluded from the candidate blocks.

On the other hand, when it is not determined that the variable m is larger than 0 and smaller than the first threshold value, the candidate blocks continue by the first threshold value or more in the first direction. For this reason, the processor 10 skips step S325 and maintains the candidate blocks that continue by the first threshold value or more as the candidate block. When the candidate block is excluded in step S325 or step S325 is skipped, the processor 10 initializes the variable m to 0 to perform counting again (step S330).

When the variable m is incremented in step S315 or the variable is initialized in step S330, the processor 10 increments the coordinate value y (step S335). Next, the processor 10 determines whether the coordinate value y exceeds the maximum value ymax (step S340). That is, the number of blocks in the first direction obtained in step S110 is ymax, and the processor 10 determines whether the candidate blocks have been scanned up to the end in the first direction (the lower end in FIG. 9).

When it is not determined in step S340 that the coordinate value y has exceeded the maximum value ymax, the processor 10 repeats the process of step S310 and its subsequent steps. On the other hand, when it is determined in step S340 that the coordinate value y exceeds the maximum value ymax, the processor 10 increments the coordinate value x (step S345), and determines whether the coordinate value x exceeds the maximum value xmax (step S350). That is, the number of blocks in the second direction obtained in step S110 is xmax, and the processor 10 determines whether the candidate blocks have been scanned up to the end in the second direction (the right end in FIG. 9). When it is not determined in step S350 that the coordinate value x has exceeded the maximum value xmax, the processor 10 repeats the process of step S305 and its subsequent steps. That is, the scanning is performed again from the upper end in the first direction at a different position in the second direction.

Figure 7:
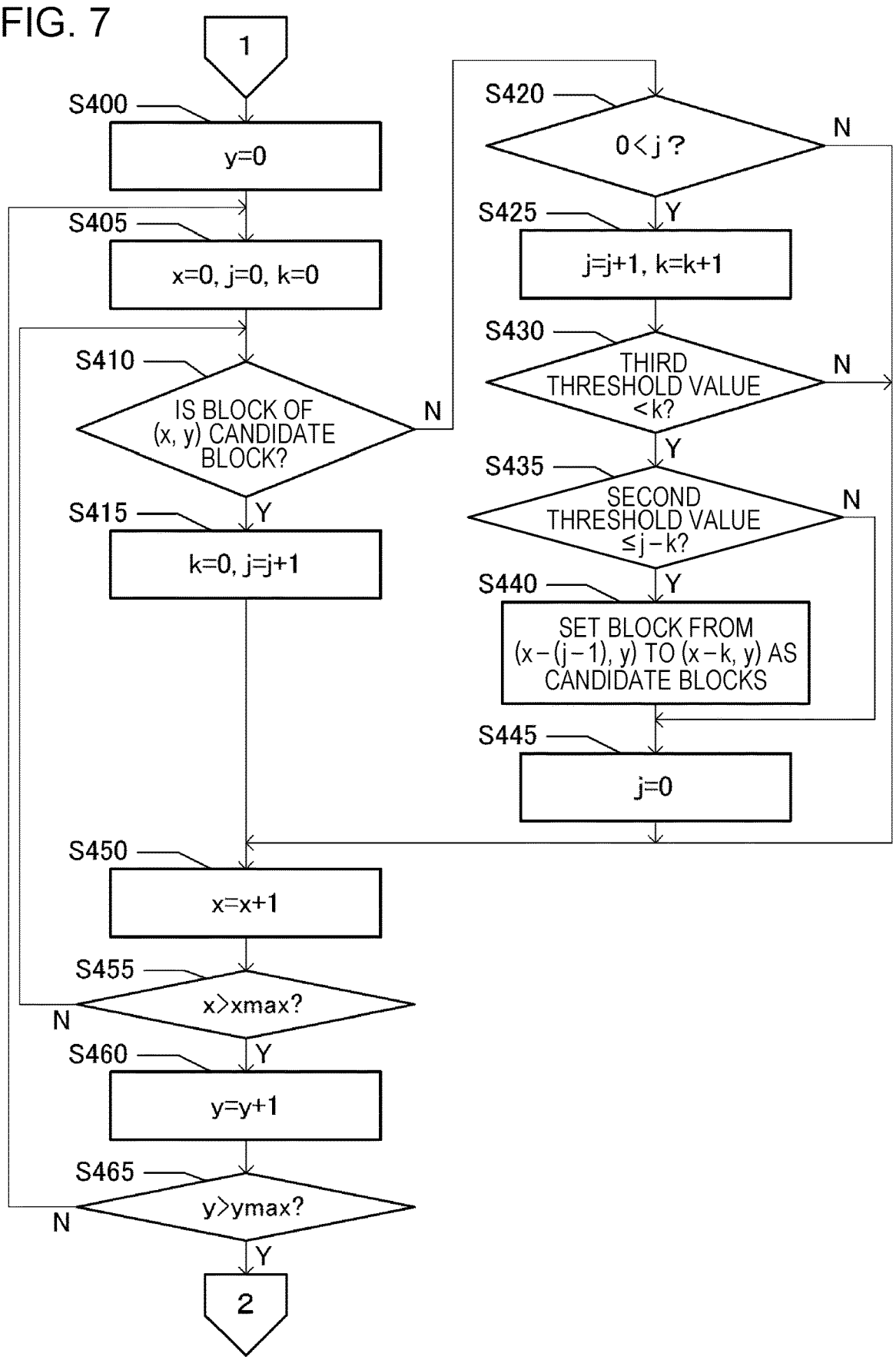
FIG. 7 is a flowchart of barcode area certification processing.

When it is determined in step S350 that the coordinate value x exceeds the maximum value xmax, the processor 10 transitions to the flowchart shown in FIG. 7, and executes the process to determine whether the candidate blocks continue in the second direction. Therefore, the processor 10 initializes the coordinate value y to 0 (step S400). Further, the processor 10 initializes the coordinate value x to 0, initializes a variable j for counting the number of consecutive candidate blocks in the second direction to 0, and initializes a variable k for counting the number of consecutive blocks in the second direction that are not the candidate block to 0 (step S405).

Next, the processor 10 determines whether the block at the coordinates (x, y) is a candidate block (step S410). That is, also in this case, all candidate blocks are processed while changing the coordinate value x in the second direction and the coordinate value y in the first direction. Therefore, the processor 10 determines whether the block indicated by the current coordinate value (x, y) is a candidate block.

When it is determined in step S410 that the block at the coordinates (x, y) is a candidate block, the processor 10 sets the variable k to 0 and increments the variable j (step S415). That is, the processor 10 increments the number of consecutive candidate blocks in the second direction by 1 while setting the number of consecutive blocks in the second direction that are not the candidate block to 0.

On the other hand, when it is not determined in step S410 that the block at the coordinates (x, y) is a candidate block, the processor 10 determines whether the variable j is larger than 0 (step S420). That is, when the block adjacent, in the negative direction of the second direction, to the block at the coordinates (x, y) is counted as a candidate block that continues in the second direction, the variable j is larger than zero. When the block adjacent, in the negative direction of the second direction, to the block at the coordinates (x, y) is not counted as a candidate block that continues in the second direction, the variable j is 0. When it is not determined in step S420 that the variable j is larger than 0, the processor 10 skips steps S425 to S445. In this case, since the process of the block at the coordinates (x, y) is not performed, the state in which the block at the coordinates (x, y) is not a candidate block is maintained.

On the other hand, when it is determined in step S420 that the variable j is larger than 0, that is, when candidate blocks continue in the second direction, the processor 10 increments the variable j and the variable k (step S425). When step S425 is executed, the block to be processed is not a candidate block. In the present embodiment, both the variable j for counting the number of consecutive candidate blocks in the second direction and the variable k for counting the number of consecutive blocks in the second direction of blocks that are not the candidate block are incremented. As a result, in the variable j, even when blocks that are not the candidate block are arranged in the second direction, the number of consecutive blocks including blocks that are not the candidate block is counted as the variable j.

Such a situation occurs, for example, when the block $B_5$ is a block to be processed. That is, when the block to be processed is the block $B_5$, it is determined in step S410 that the block at the coordinates (x, y) is not a candidate block. In this case, since the variable j for the block to be processed immediately before was 1 when the step S410 was executed on the block $B_6$, it is determined in step S420 that 0<j, and in step S425, the variable j is 2 and the variable k is 1. Therefore, in the arrangement of blocks $B_6$ and $B_5$, when step S425 is executed, the variable j is counted as 2, which is the sum of the numbers of the block $B_5$ which is a candidate block and the block $B_6$ which is not a candidate block. The variable k represents the number of consecutive blocks that are not candidate blocks among these blocks.

Next, the processor 10 determines whether the variable k is larger than the third threshold value (step S430). Here, the third threshold value is an upper limit value that can be regarded as a barcode even when blocks that are not the candidate block are arranged in the second direction. That is, unless it is determined in step S430 that the variable k is larger than the third threshold value, the processor 10 skips steps S435 to S445 in order to continue counting.

On the other hand, when it is determined in step S430 that the variable k is larger than the third threshold value, the processor 10 determines whether the value "j−k" obtained by subtracting the variable k from the variable j is equal to or larger than the second threshold value (step S435). That is, even when blocks that are not candidate blocks are arranged in the second direction, the processor 10 specifies the number excluding these blocks by "j−k".

When it is determined in step S435 that the value "j−k" obtained by subtracting the variable k from the variable j is equal to or larger than the second threshold value, the processor 10 sets blocks from at the coordinates (x−(j−1), y) to at the coordinates (x−k, y) to the candidate block (step S440). That is, the processor 10 regards blocks, including blocks that are not candidate blocks, present in this range as the candidate block.

On the other hand, when it is not determined in step S435 that the value "j−k" obtained by subtracting the variable k from the variable j is equal to or larger than the second threshold value, the processor 10 skips step S440, and does not perform the process of regarding a block that was not a candidate block as the candidate block. When the candidate block is set in step S440 or step S440 is skipped, the processor 10 initializes the variable j to 0 for counting again (step S445). In the loop of steps S410 to S455, the initialization of the variable j is performed only when the variable k is larger than the third threshold value in step S430. Therefore, even when the block to be processed is not a candidate block during the loop process, as long as the number of candidate blocks arranged in the second direction is equal to or less than the third threshold value, the number indicating both the candidate block and the block that is not the candidate block is counted as the variable j. In this case, a block that is not a candidate block is also called a non-candidate block.

When the variable j is incremented in step S415, when the variable is initialized in step S445, when it is not determined in step S420 that the variable j is larger than 0, or when it is determined in step S430 that the variable k is equal to or larger than the third threshold value, the processor 10 increments the coordinate value x (step S450). Next, the processor 10 determines whether the coordinate value x exceeds the maximum value xmax (step S455). That is, the processor 10 determines whether the candidate blocks have been scanned up to the end in the second direction (the right end in FIG. 9).

When it is not determined in step S455 that the coordinate value x has exceeded the maximum value xmax, the processor 10 repeats the process of step S410 and its subsequent steps. On the other hand, when it is determined in step S455 that the coordinate value x exceeds the maximum value xmax, the processor 10 increments the coordinate value y (step S460), and determines whether the coordinate value y exceeds the maximum value ymax (step S465). That is, the processor 10 determines whether the candidate blocks have been scanned up to the end in the first direction (the lower end in FIG. 9). When it is not determined in step S465 that the coordinate value y has exceeded the maximum value ymax, the processor 10 repeats the process of step S405 and its subsequent steps. That is, the scanning is performed again from the left end in the second direction at a different position in the first direction.

Here, a series of determinations when the second threshold value is 10, the third threshold value is 3, and the block $B_7$ in FIG. 9 is the block to be processed will be described. In this case, it is determined in step S410 that the block $B_7$ at the coordinates (x, y) is a candidate block, and the variable k is 0 and the variable j is 1 in step S415. In step S450, the coordinate value x is incremented. As a result, the same process is repeated on the block to the right of the block $B_7$ so that the variable k becomes 0 and the variable j becomes 2. Next, when the block $B_8$ is a block to be processed, it is determined in step S410 that the block $B_8$ is not a candidate block.

In this case, since the variable j is 2, it is determined in step S420 that the variable j is larger than 0, and the variable j is 3 and the variable k is 1 in step S420. As a result, the value of the variable j indicates 3 which is the number of blocks present in the second direction in the block $B_7$ to the block $B_8$, and the value of the variable k indicates the number of blocks that continue in the block $B_7$ to the block $B_8$ and that are not the candidate block.

Further, since the variable k is 1, it is determined in step S430 that the variable is smaller than 3, which is the third threshold value, and steps S435 to S445 are skipped. Thereafter, the block to be processed is sequentially switched to the right in the second direction, and the same process is repeated. In the process of repetition, when the block to be processed is a candidate block, the variable k is initialized to 0.

Based on the determination in step S430, such process is repeated until blocks that are not the candidate block are arranged in the second direction by a third threshold value or more. Therefore, in this example, the process is repeated until the block $B_9$ is a block to be processed, and the variable k becomes 4 in step S425. In this case, the processor 10 executes step S435 through the determination of step S430.

At this stage, the value of the variable j indicates 22, which is the number of blocks present in the second direction in the block $B_7$ to the block $B_9$, and the value of the variable k indicates 4 which is the number of blocks that are not the non-candidate block in the block $B_7$ to the block $B_9$ in the final stage of the loop. That is, the value of the variable k indicates 4 which is the number of consecutive blocks that are not the candidate block in the blocks $B_{11}$ to $B_9$. Therefore, "j−k" is 18, and it is determined that "j−k" is 10 or more, which is the second threshold value. As a result, in step S440, the block group $B_{12}$ from the block $B_7$ at the coordinates (x−(22−1), y) to the block $B_{10}$ at the coordinates (x−4, y) is set to a candidate block. That is, blocks that were originally the candidate block (the block $B_7$ and the like) and blocks that were the non-candidate block (the block $B_8$ and the like) included in the block group $B_{12}$ are candidate blocks that can be certified as barcode area.

Figure 8:
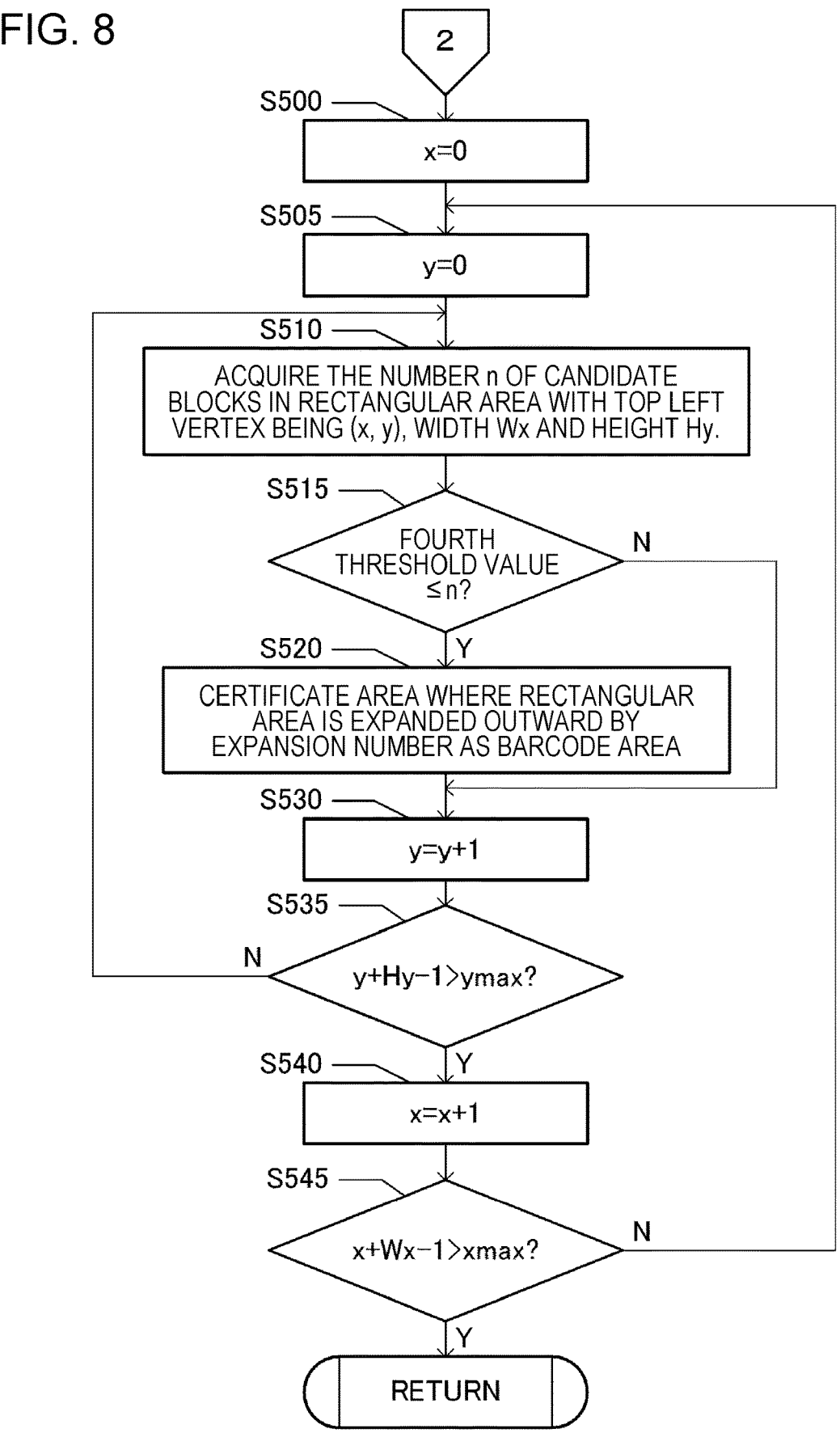
FIG. 8 is a flowchart of barcode area certification processing.

When it is determined in step S465 that the coordinate value y has exceeded the maximum value ymax, the processor 10 transitions to the flowchart shown in FIG. 8 to perform the process to determine whether the candidate blocks are two-dimensionally expanded. Therefore, the processor 10 initializes the coordinate value x to 0 (step S500). Further, the processor 10 initializes the coordinate value y to 0 (step S505).

Figure 10:
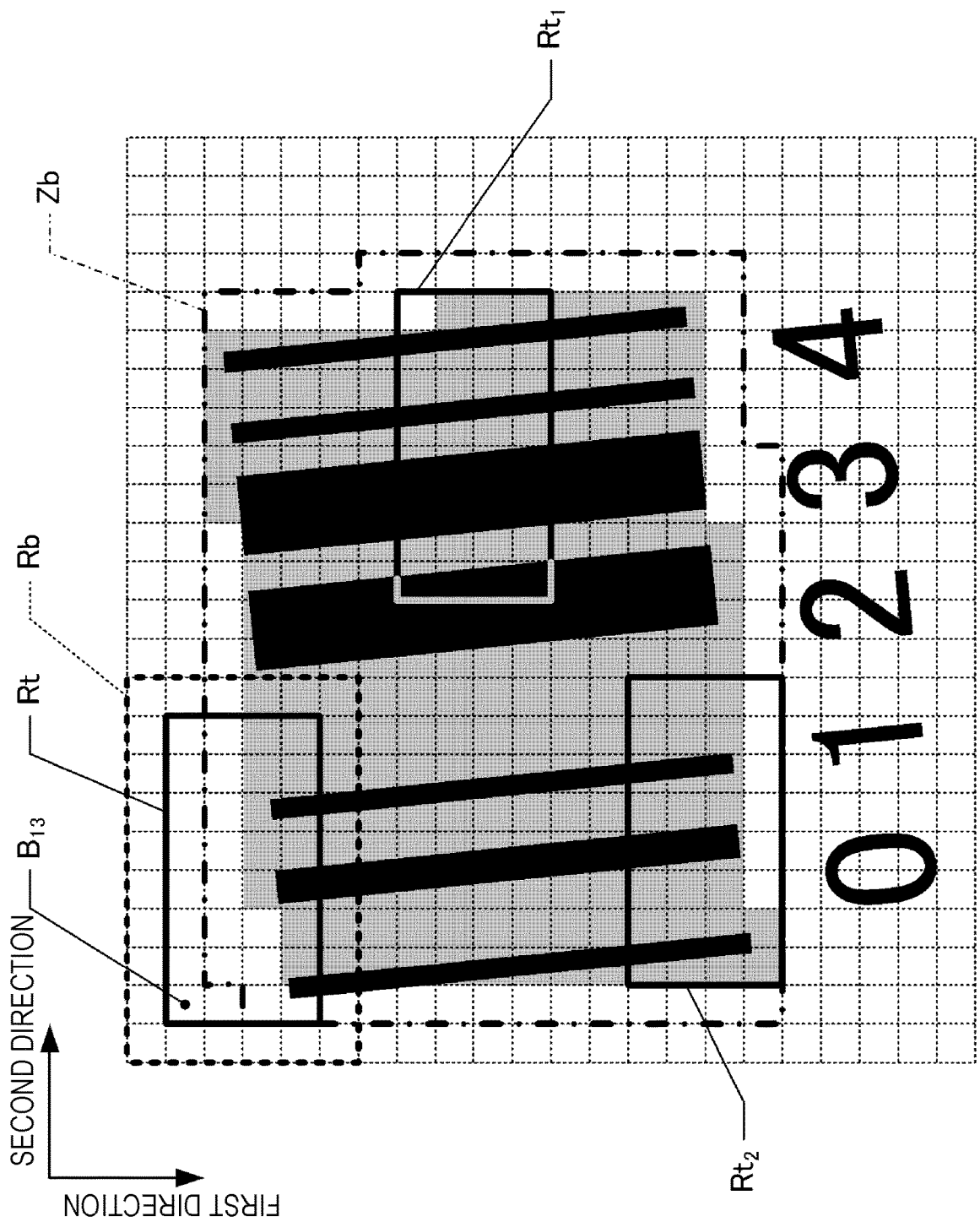
FIG. 10 is a diagram illustrating an example of a barcode area certification.

Next, the processor 10 acquires the number n of candidate blocks in the rectangular area having the coordinates (x, y) at the upper left vertex, and the width Wx and the height Hy (step S510). The processor 10 determines whether the number n is equal to or larger than the fourth threshold value (step S515). FIG. 10 is a diagram showing, in gray, blocks that are candidate blocks by the processes up to step S465 in the example shown in FIG. 9. FIG. 10 illustrates a rectangular area Rt having a width Wx and a height Hy. That is, FIG. 10 illustrates the position of the rectangular area Rt when the upper left vertex is the block $B_{13}$. In this case, the processor 10 acquires the number n of candidate blocks indicated by gray as 12.

When it is determined in step S515 that the number n is equal to or larger than the fourth threshold value, the processor 10 certifies the area acquired by expanding the rectangular area outward by the expansion number as a barcode area (step S520). That is, in the present embodiment, the barcode area is regarded as a two-dimensionally continuous area, and when most of the rectangular area is filled with candidate blocks, the processor 10 regards the entire rectangular area as the barcode area. For this reason, the fourth threshold value is set as a value such that most of the rectangular area is filled with candidate blocks, and the entire rectangular area can be regarded as the barcode area.

In the present embodiment, the fourth threshold value is "the number of blocks in the rectangular area−1", but may be another value, for example, the number same as that of the rectangular area or "the number of blocks in the rectangular area−2". The fourth threshold value is preferably 95% or more of the number of blocks in the rectangular area. When the fourth threshold value is "the number of blocks in the rectangular area−1", in a case of, for example, the rectangular area $Rt_1$ shown in FIG. 10, it is determined that the number n of the candidate blocks in the rectangular area $Rt_1$ is equal to or larger than the fourth threshold value. On the other hand, in a case of the rectangular area $Rt_2$, it is not determined that the number n of the candidate blocks in the rectangular area $Rt_2$ is equal to or larger than the fourth threshold value.

In the present embodiment, in consideration of the case where there is an oversight when selecting candidate blocks, an area obtained by expanding the rectangular area outward by the expansion number is certified as the barcode area. In FIG. 10, the area Rb after the rectangular area Rt is expanded when the expansion number is 1 is indicated by the broken line. According to the above processing, even when a barcode is tilted as shown in FIG. 10, the candidate blocks are certified as the barcode area without missing the top, bottom, left, and right ends of the barcode.

When the barcode area is certified in step S520, or when it is not determined in step S515 that the number n is equal to or larger than the fourth threshold value, the processor 10 increments the coordinate value y (step S530). Next, the processor 10 determines whether "the coordinate value y+the rectangular area height Hy−1" exceeds the maximum value ymax (step S535). That is, the processor 10 determines whether the lower end of the rectangular area exceeds the end portion in the first direction (the lower end in FIG. 10).

When it is not determined in step S535 that "the coordinate value y+the rectangular area height Hy−1" exceeds the maximum value ymax, the processor 10 repeats the process of step S510 and its subsequent steps. On the other hand, when it is determined in step S535 that "the coordinate value y+the rectangular area height Hy−1" exceeds the maximum value ymax, the processor 10 increments the coordinate value x (step S540), and determines whether "the coordinate value x+the rectangular area width Wx−1" exceeds the maximum value xmax (step S545). That is, the processor 10 determines whether the right end of the rectangular area exceeds the end portion in the second direction (the right end in FIG. 10). When it is not determined in step S545 that "the coordinate value x+the rectangular area width Wx−1" exceeds the maximum value xmax, the processor 10 repeats the process of step S505 and its subsequent steps. That is, the scanning is performed again from the upper end in the first direction at a different position in the second direction.

Figure 2:
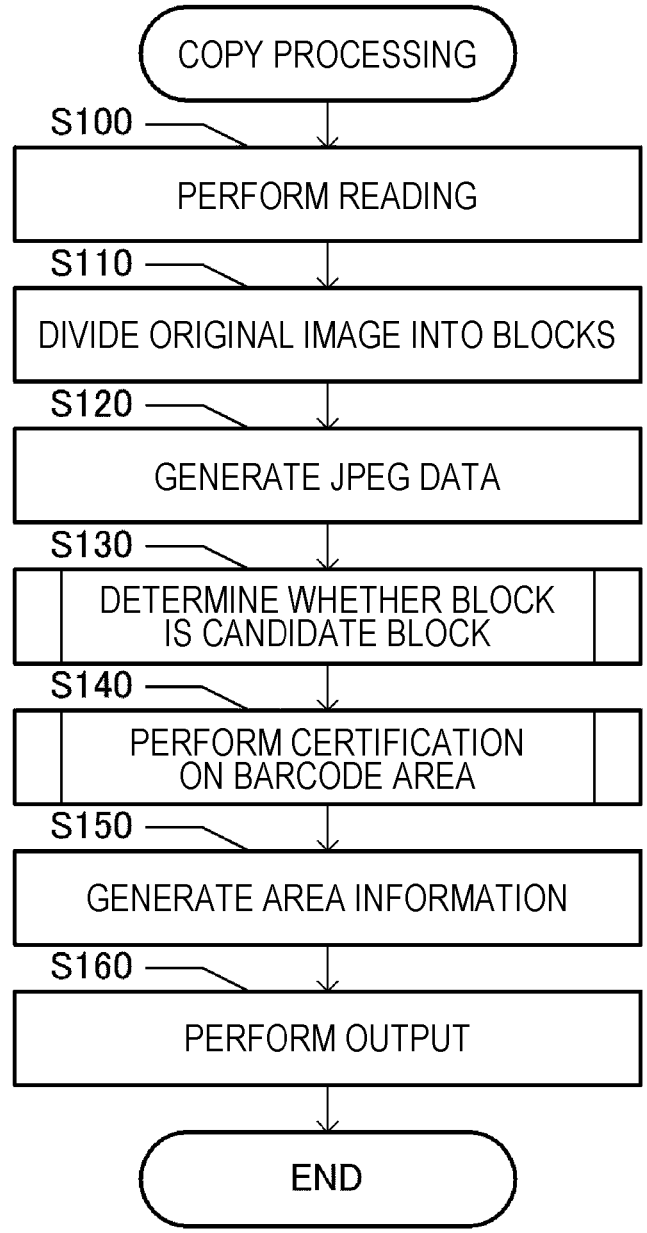
FIG. 2 is a flowchart of copy processing.

When it is determined in step S545 that "the coordinate value x+the rectangular area width Wx−1" exceeds the maximum value xmax, the processor 10 ends the barcode area certification process and returns to the process shown in FIG. 2. With the above processing, it is possible to certify the barcode area that expands two-dimensionally based on the candidate blocks that expand two-dimensionally. In FIG. 10, the barcode area Zb certified by the above processing is indicated by the one-dot chain line. 5. Other embodiments:

The above embodiment is an example for carrying out the present disclosure, and various other embodiments can be implemented. For example, the image output device according to an embodiment of the present disclosure may be a printing apparatus that acquires original image data by a method which is different from scanning and prints an image including a barcode. Furthermore, the printing method in the printing unit 50 is not limited to the ink jet method, and may be another method such as an electrophotographic method. In this case, the barcode area is preferably printed with less ink bleeding than another area (for example, black character area), for example, in a state where the ink density is low. For example, in the case of the electrophotographic system, the present disclosure can be implemented by a configuration in which the light amount for controlling the toner recording amount is made weaker than the normal light amount.

Further, the method for determining whether the original image is the barcode area for each block as in the above embodiment can be implemented as a program disclosure, a method disclosure, or an output image data generation method disclosure.

Furthermore, the processing in at least part of the processor 10 may be executed by a driver program or an application program of a computer connected to the image output device 1. In this case, the computer can be regarded as part of the image output device.

Furthermore, the above-described embodiment is an example, and an embodiment in which part of the configuration is omitted or another configuration is added may be employed. For example, a configuration in which steps S500 to S545 are omitted and the candidate blocks remaining at this stage are certified as the barcode area may be employed.

The acquisition unit may acquire original image data indicating the original image. That is, the original image is an image that is to be output and that has not been subjected to an output process, and the acquisition unit may acquire original image data indicating the original image. The aspect in which original image data is acquired may include various aspects. That is, the acquisition unit may be a scanner, or may acquire original image data from another device (for example, another computer or storage medium) by communication. Both the original image and the output image are images, and when it is not necessary to distinguish them, they may be collectively referred to as the image.

The first generation unit may certify for each block whether the original image is the barcode area, and may generate area information that indicates whether the original image is the barcode area where the area information is associated with each block. That is, information that can specify for each block whether the original image is the barcode area may be defined as area information.

The block is a unit for JPEG compression, but when a block consisting of multiple pixels is defined, it is possible to express the area information indicating whether the original image is the bar code with a small amount of information even when the block is not a unit for JPEG compression.

When the block is a unit for JPEG compression, the block used when JPEG compression is performed can be used for the definition of whether the block is the barcode area. Furthermore, it is preferable that there be s a process that is to be performed on a block basis and that can be used for certification of the barcode area when JPEG compression is used.

Various methods in addition to the above-mentioned certification method using the first threshold value to the fourth threshold value may be employed for performing the certification of the barcode area. For example, it may be certified whether the image is the barcode area based on a machine-learned model, or it may be certified whether the image is the barcode area by pattern matching or the like.

The barcode area may be an area that includes an object that is likely to be the barcode. A block other than the block estimated to be the barcode, for example, a block adjacent to the block estimated to be the barcode may be included in the barcode area.

The area information may indicate whether each block is the barcode area. It is preferable that the area information is 1-bit of information per block (that is, 1 bit flag), but the amount of information may be larger than this for more detailed analysis. For example, the area information may include a value indicating the possibility that the object in the barcode area is the barcode or the possibility that an object other than the barcode is included. The area information may be generated after a print start instruction, or may be generated in advance and recorded on a recording medium regardless of the presence or absence of the print start instruction.

The storage unit may store output image data for outputting an original image, and may store the area information. Of course, the area information may be part of the output image data, or may be continuously recorded in another data (information indicating the type of an object in the block) as in the above-described embodiment. The storage unit may store the output image data for a long time until after printing, or may store the output image data for a short time such as a buffer. The output image data may indicate the original image to be output, and is preferably JPEG data, but may be in another form. Of course, at the time of printing, the JPEG data may be further converted to another data (for example, postscript data).

The output unit may perform output based on the output image data by using methods that are different between the area indicated, by the area information, to be the barcode area and the area indicated not to be the barcode area. This may be implemented by changing the method of image processing performed before reaching the circuit that performs output, or may be implemented by changing the operation method of the circuit that performs output. That is, the output unit can switch the output method for each object in the area, and switches the output method depending on whether the block is the barcode area. It is preferable that the barcode area be output in a manner that the barcode is easily read. Various configurations can be employed in addition to a configuration in which the density or the concentration of the recording material on which the barcode is recorded are made larger or smaller than that of another object. How to adjust the density or the concentration may be selected depending on the equipment on which output is performed (display, projector, electronic paper, and the like).

The division unit may divide the original image data into blocks. When the output image data is JPEG data, the original image data is divided into blocks in JPEG compression. Therefore, the block used in JPEG compression can be used for certifying the barcode area. While the size of the block is not limited and the block may have various sizes, for ease of processing, it is preferable that the plurality of blocks have the same size except for those at the edge of the image, and be square or rectangular. JPEG compression may be a known technique.

A configuration in which the original image data is JPEG data may be employed. In this case, since the original image data is compressed for each block, the block may be used for certifying the barcode area. Therefore, it is possible to omit the division unit that divides the original image into the blocks for certifying the barcode area.

As a method for performing printing in a state where the ink recording density in the barcode area is lower than that when performing normal printing, various configurations can be employed in addition to the configuration in which the size of the ink dots is adjusted. For example, the output unit may be configured such that printing is performed with a lower concentration with respect to the original image with an identical concentration when printing an area indicated to be the barcode area than when printing an area indicated not to be the barcode area. The density adjustment can be implemented by various methods. For example, when the number of dots when printing an area indicated to be the barcode area is smaller than that when performing normal printing, the density can be reduced.

Data indicating the contents of blocks in the output image data is not limited to information indicating whether each block is a black character area as in the above-described embodiment, but may be image data for each block, compressed data for each block, or the like.

The determination unit may determine whether each block acquired by dividing the image is a candidate block that is a candidate for a block in the barcode area. Therefore, various configurations in addition to the configuration in which a block that may be the black character area or the barcode area becomes a candidate block as described above may be employed. For example, a block including a predetermined number or more of black and white pixels, a block including a predetermined number or more of pixels constituting a black straight line, a block whose adjacent block has a black portion, and the like may be the candidate block. By determining a predetermined color component as in the above-described embodiment, the block may correspond to the color barcode of the color.

The certification unit may certify, as a barcode area, an area in which candidate blocks continue by a first threshold value or more in the first direction and are arranged by a second threshold value or more in a second direction orthogonal to the first direction. That is, when a predetermined number or more of candidate blocks are arranged in two orthogonal directions, the candidate blocks can be certified as the barcode area. The first threshold value and the second threshold value may be set in advance so that it is reasonable to estimate that candidate blocks are regarded as the barcode area when the candidate blocks continue by the first threshold value and the second threshold value or more.

The first threshold value and the second threshold value may be fixed values or variable values. Whey they are variable values, at least one of the first threshold value and the second threshold value may be a value corresponding to the reading resolution of the scanner. That is, by assuming that the number of candidate blocks that can continue will change when the resolution changes, the first threshold value and the second threshold value may be changed depending on the resolution. Of course, the same applies to the third threshold value and the fourth threshold value, and they may be fixed values or variable values. When they are variable values, for example, at least one of these threshold values may be a value corresponding to the reading resolution of the scanner. Furthermore, at least one of the first threshold value to the fourth threshold value may change according to another factor. For example, the at least one may change according to the size of the block.

In addition, when changing a threshold value according to the resolution and the size of the block, the configuration in which the threshold is changed in proportion to or inverse-proportion to the resolution and the size of the block may be employed. For example, the configuration in which the threshold value is proportional to the resolution and inversely proportional to the block size can be employed. More specifically, when the threshold value is a specific value at the reference resolution, a configuration in which the threshold is doubled when the resolution is double and the block size is the same is preferable. A configuration in which the threshold value is halved when the resolution is the same and the block size is double is preferable.

The threshold value may be determined assuming a general sized barcode or a relatively small sized barcode. For example, it is assumed that the length of the straight line constituting the barcode is about 3 mm or more as a relatively small sized barcode. In this case, when the reading resolution of the scanner is 300 dpi and the block size is 8×8 pixels, the first threshold value is preferably 4 or more. This is because, in this case, the block has a size of 0.677 mm (=25.4 mm×8/300) at one side, and 3 mm corresponds to 4.4 blocks.

In the case of the above assumption, it is preferable that the second threshold value is preferably set to a value of 10 or more. This is because a relatively small sized bar code has a width of about 7 mm or more and the value is 10.3 when converted to a block having a side of 0.677 mm. In the case of the above assumption, the third threshold value is preferably set to a value of 5 or less. This is because a relatively small sized barcode has a gap between the straight lines of about 3 mm, and about 4.4 blocks can correspond to the gap. For this reason, the value for evaluating the gap is preferably set to a value of about 5 or less.

In the case of the above assumption, the height Hy of the rectangular area is preferably about the first threshold value or a value slightly smaller than the first threshold value. The width Wx of the rectangular area is preferably about the second threshold value or slightly smaller than the second threshold value. When the slightly smaller value is used, detection leakage is less likely to occur even when the barcode is inclined with respect to the first direction or the second direction.

In the case of the above assumption, the fourth threshold value is preferably 95% or more of the number of blocks in the rectangular area as described above, and is preferably a value slightly less than 100%. When the value is slightly less than 100%, a false negative is not likely to occur even when a reading defect or the like occurs due to a barcode inclination, a reading inclination or noise.

The expansion number of the rectangular area may be a value of about 1 or 2 regardless of the reading resolution and the number of pixels of the block. The expansion number is set so that the top, bottom, left and right edges are not interrupted in the area determination process, such as when the barcode is tilted, and the expansion number of 1 or 2 may be enough to suppress the interruption.

Furthermore, the certification unit may perform certification on the barcode area with each of the two orthogonal directions as the first direction. That is, the flowchart shown in FIGS. 6 to 8 may be executed with the direction parallel to one of the coordinate axes of the original image as the first direction, and thereafter, the flowchart shown in FIGS. 6 to 8 may be executed again by rotating the first direction by 90 degrees. Of course, the second process may be performed when a sufficiently wide barcode area is not certified in the first process, or may be performed in accordance with a user instruction. According to the above configuration, the barcode area can be certified even when the straight line of the barcode is parallel to any of the longitudinal and lateral directions of the document. Of course, when the barcode can be oriented in a larger number of directions, three or more directions may be set as the first direction. In other words, it is desirable to perform a process in which the direction in which the barcode is likely to be oriented is set to the first direction.

Furthermore, the present disclosure can also be applied as a program or method executed by a computer. Further, the above-described program and method may be implemented using a single device or may be implemented using components included in a plurality of devices, and include various aspects. Further, changes may be made as appropriate, as in the case where part of the embodiment is software and part of the embodiment is hardware.

Furthermore, the disclosure is established as a recording medium of a program. Of course, the recording medium of the program may be a magnetic recording medium, a semiconductor memory, or any recording medium to be developed in the future.

What is claimed is:

1. An image output device comprising:
    an acquisition unit that acquires original image data representing an original image, wherein the original image data has been divided into a plurality of blocks;
    a first generation unit that certifies, for each of the plurality of blocks, whether the original image is a barcode area, and that generates area information indicating whether the original image is the barcode area, the area information being associated with each of the blocks;
    a storage unit that stores output image data for outputting the original image; and
    an output unit that performs output based on the output image data using methods that are different between an area indicated, by the area information, to be the barcode area and an area indicated not to be the barcode area, wherein the output image data is JPEG data compressed for the each block.

2. The image output device according to claim 1, further comprising:
    a division unit that divides the original image data into the blocks; and
    a second generation unit that generates, as the output image data, JPEG data obtained by compressing the original image data for the each block.

3. The image output device according to claim 1, wherein the original image data is JPEG data.

4. The image output device according to claim 1, wherein the output unit is configured such that printing is performed using a larger dot when printing an area indicated to be the barcode area than when printing an area indicated not to be the barcode area.

5. The image output device according to claim 1, wherein the output unit is configured such that printing is performed with a lower concentration with respect to the original image with an identical concentration when printing an area indicated to be the barcode area than when printing an area indicated not to be the barcode area.

6. The image output device according to claim 1, wherein the area information is 1-bit information per the one block.

7. The image output device according to claim 1, wherein the area information is information continuous to data indicating contents of the block in the output image data.

8. An image output method comprising:
    acquiring original image data representing an original image, wherein the original image data has been divided into a plurality of blocks;
    certifying, for each of the plurality of blocks, whether the original image is a barcode area;
    generating area information indicating whether the original image is the barcode area, the area information being associated with each of the blocks; and
    performing output based on output image data for outputting the original image using methods that are different between an area indicated, by the area information, to be the barcode area and an area indicated not to be the barcode area, wherein the output image data is JPEG data compressed for the each block.

* * * * *